June 29, 1948.  J. V. GIESLER  2,444,192
MANUFACTURE OF DAMPED BELLOWS
Original Filed May 11, 1942  2 Sheets-Sheet 1
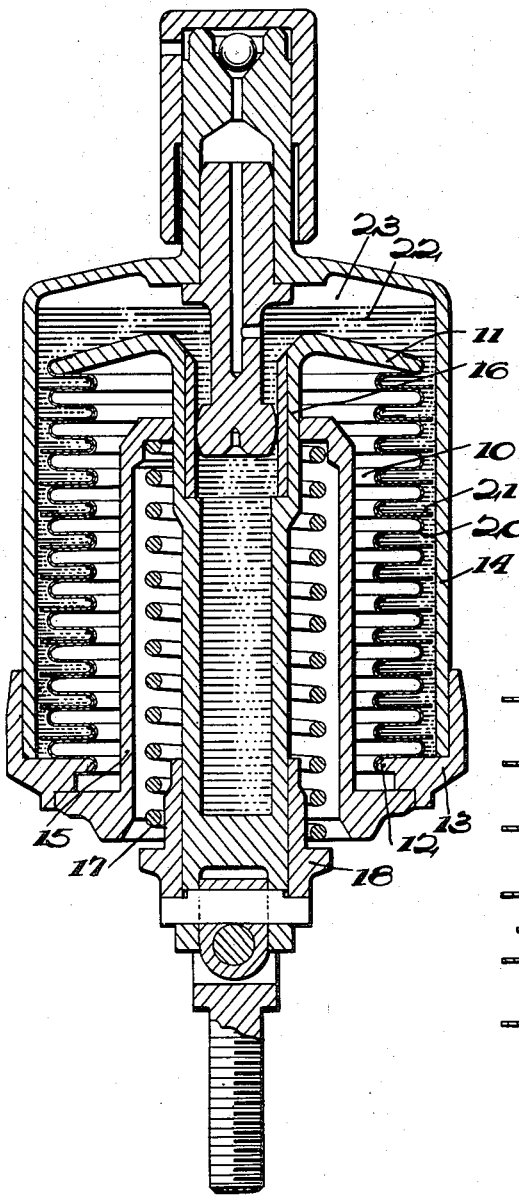
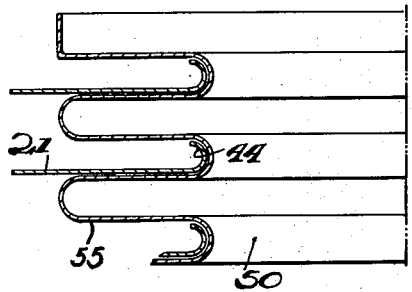
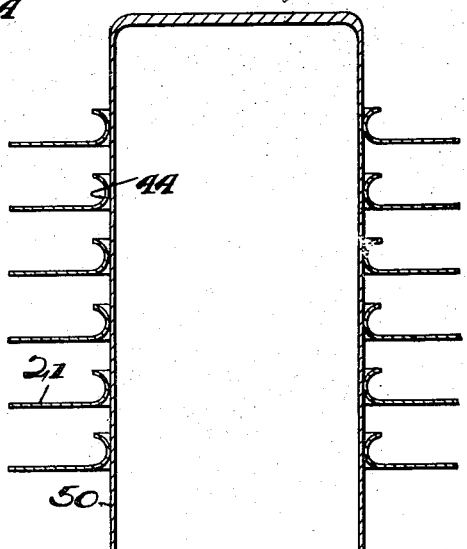
Inventor
Jean V. Giesler
By Cameron, Kerkam + Sutton
Attorneys June 29, 1948.  J. V. GIESLER  2,444,192
MANUFACTURE OF DAMPED BELLOWS
Original Filed May 11, 1942  2 Sheets-Sheet 2
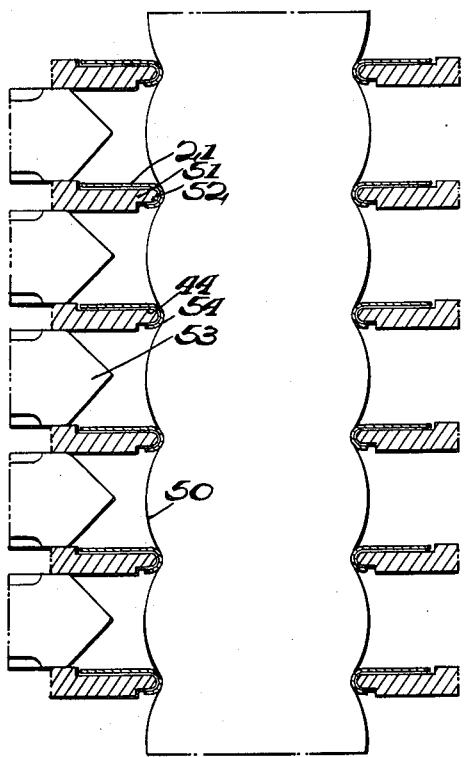
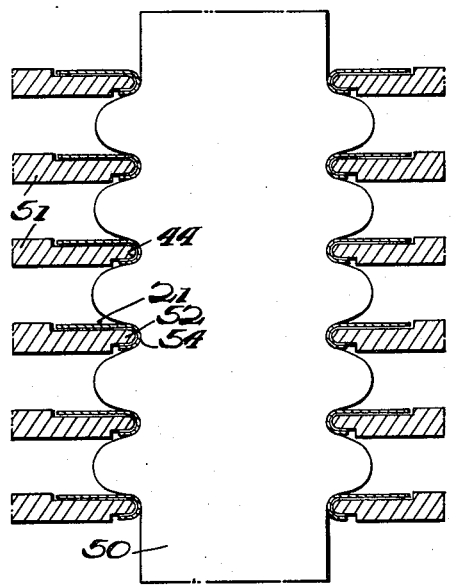
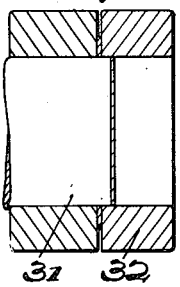 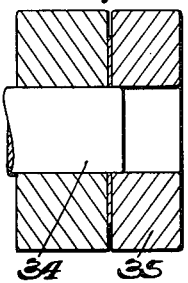 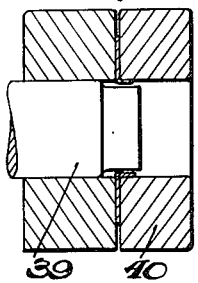 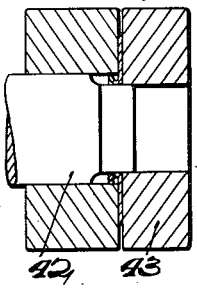 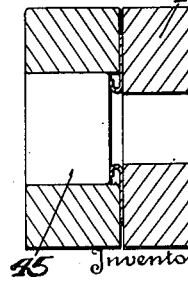
Inventor
Jean V. Giesler
By Cameron Kerkam+Sutton
Attorneys Patented June 29, 1948

2,444,192

UNITED STATES PATENT OFFICE 2,444,192

MANUFACTURE OF DAMPED BELLOWS

Jean V. Giesler, Knoxville, Tenn., assignor to Robertshaw-Fulton Controls Company, a corporation of Delaware Original application May 11, 1942, Serial No. 442,514, now Patent No. 2,434,794, dated January 20, 1948. Divided and this application May 29, 1944, Serial No. 537,901

12 Claims. (Cl. 113—116)

This invention relates to a method of making a damping bellows.

Metallic bellows when subjected to vibration whose frequency is close to the natural period of the bellows have been found to have a materially shortened life, and this has interfered to some extent with their use where they are likely to be subjected to rather severe vibrations, as on aircraft engines. Various mechanical damping means have been proposed, but while they were successful in reducing the amplitude of vibration of the bellows, they have had the defect that they have relied to a greater or lesser extent on the action of friction, and as friction varies under different conditions the use of friction to effect damping has resulted in erratic operation.

In my application Serial No. 442,514, filed May 11, 1942, now Pat. No. 2,434,794, dated Jan. 20, 1948, for Damping of bellows, of which this application is a division, I have disclosed and claimed a novel damping bellows and method of damping wherein a bellows is provided with fins which are adapted to utilize the principle of a dash pot to effect damping.

It is an object of this invention to provide a novel method of making a bellows structure that is adapted to effect such damping action.

Another object of this invention is to provide a novel method of making a bellows having damping fins integrated with the corrugations thereof.

Another object of this invention is to provide a novel method of making damping elements.

Other objects will appear as the description of the invention proceeds.

The invention is capable of receiving a variety of expressions, one of which is illustrated on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures, Fig. 1 is an axial section through a bellows structure provided with damping means in conformity with the present invention;

Fig. 2 is an enlarged fragmentary section of a bellows to show the damping elements in position;

Fig. 3 is a diagrammatic view to illustrate the manner in which the damping elements are initially assembled with the tube before corrugation;

Fig. 4 is a diagrammatic view on a larger scale to illustrate the first step in integrating the damping elements with the tube;

Fig. 5 is a corresponding view but illustrating a subsequent step in the integration of the damping elements with the corrugations;

Figs. 6 to 10, inclusive, are diagrammatic views illustrating successive steps in the formation of a damping element; and Figs. 11 to 15, inclusive, are corresponding views to illustrate diagrammatically the formation of the elements shown in Figs. 6 to 10 respectively.

Referring first to Fig. 1, 10 designates a bellows of any suitable size, construction and material, here shown as in the form of a one-piece expansible and collapsible corrugated tubular wall having one end suitably attached to an end member 11 and its opposite end suitably attached to a flange 12 on a casing element 13. As shown, the bellows 10 is mounted in a tubular housing 14 having a reentrant wall 15 which is apertured at its inner end to slidingly receive a post 16 attached to or integrally formed on the movable end member 11. Post 16 is connected to any suitable element to be controlled and in the form shown a coil spring 17 is interposed between a flange or collar 18 on the post 16 and the inner end of the reentrant wall 15. As the present invention may be embodied in any suitable bellows structure applied to any suitable operating or controlling mechanism, the means for mounting and connecting the bellows constitute no part of the present invention, and said mounting and connecting means are therefore to be taken as illustrative only.

In conformity with the present invention, one or more of the corrugations 20 of the bellows 10, and preferably all of them, have integrated therewith in any suitable way annular fins 21 which project radially and circumferentially beyond the periphery of the bellows. Surrounding the periphery of the fins 21 is a confining wall, here shown as the tubular wall 14 of the encasing structure, and said wall 14 is so disposed with respect to said fins as to make a small but predetermined clearance with the periphery of said fins. The space between the bellows 20 and the confining wall 14 is filled with a suitable liquid, preferably oil, said oil extending into the chamber 22 above the bellows as illustrated with a sufficient space 23 thereabove to provide for the movement of the oil next to be explained.

At any given position of the corrugations of the bellows, the spaces between the corrugations and fins are solidly filled with the oil, and therefore before movement of the bellows by way of expansion or contraction can occur it is necessary that the oil in the intercorrugation spaces between the fins be displaced from said spaces, if contraction of the corrugations is to be permitted, or that oil flow into said spaces, if expansion of the corrugations is to be permitted against the effort to create a vacuum. The flow of oil into or out of the intercorrugation spaces, as these spaces are increased or decreased in volume by the expansion or contraction of the bellows, therefore requires an appreciable period of time depending upon the rate of flow of the oil as determined by the clearance existing between the periphery of the fins 21 and the confining wall 14. By nicely predetermining this clearance the rate of oil flow and therefore the resistance to expansion or contraction of the corrugations can be accurately predetermined. Thus each corrugation provided with a fin acts in the nature of a dash pot and resists any tendency to vibrate at a relatively high frequency. Tests on structures of this type have shown that a considerably increased life has been given to a bellows subjected to a vibrational tendency, the vibration having been largely damped out owing to the dash pot action of the fins. As the flow of oil into and out of the intercorrugation spaces effects a positive and uniform retardation of response to vibrational tendencies the damping action is effected without the irregularities which arise when friction is used to damp vibration.

While a bellows constructed to effect damping as herein disclosed may be made in any suitable way, the present invention involves a novel method whereby such a damping bellows may be produced.

The fins used in damping the bellows may be made in any suitable way, the preferred procedure being shown in Figs. 11 to 15, inclusive, the product of the several steps being illustrated in Figs. 6 to 10, inclusive, respectively. As here shown, a disk of thin metal 30 having the predetermined diameter appropriate for the finished fin is cut from sheet stock, as by a punch 31 cooperating with a die 32. The center portion of disk 30 is then cut out as shown at 33 in Fig. 7, as by a punch 34 cooperating with a piercing die 35, the inner diameter of the aperture 33 being such that when the inner periphery of the annulus so formed is shaped as next to be described the center aperture will make a close sliding fit with the exterior of the tube to be corrugated. The annular disk 30 is then flanged at its inner periphery as shown at 36 in Fig. 8, as by a punch 39 cooperating with a forming die 40, and said flange 36 is then bent outwardly as shown at 41 in Fig 9, as by a second forming punch 42 cooperating with a forming die 43. Flange 36 is then bent into the substantially semicircular form as shown at 44 in Fig. 10, as by a further forming punch 45 cooperating with a forming die 46. It is to be understood that Figures 6 to 15, inclusive, are diagrammatic only, no effort having been made to properly proportion the size of the disk to the size of the reversely curved bend produced at the inner periphery of the annulus formed. When completed, the fin has at its inner periphery a reversely bent portion substantially in the form of a semicircular curve, the radius of curvature of which is such that said reversely bent portion will snugly fit the inner periphery of a forming ring as shown in the enlarged sections of Figs. 4 and 5.

Assuming, as is preferred, that all of the corrugations are to have fins integrated therewith, the tube 50 (Fig. 3) which is to be corrugated has mounted thereon and equally spaced therealong a plurality of fins 21 corresponding in number with the corrugations to be formed, the spacing of the fins corresponding with the amount of metal that is to go into each corrugation.

The corrugating operation by which the fins are integrated with the bellows as the corrugations are formed is illustrated in Figs. 4 and 5. As here shown, each forming ring 51 has mounted thereon and snugly fitting its curved inner extremity 52 a fin 21 as heretofore described. The forming rings 51 are spaced at uniform distances by spacers 53 of suitable width to predetermine the amount of metal of the tube that is to go into each corrugation as understood in the art of hydrostatically corrugating tubes to produce bellows. Hydrostatic pressure is then introduced into the tube 50, and the tube is bulged between the forming rings 51 to lock the fins 21 in the depressions 54 between the bulges. The spacers 53 are then withdrawn and the corrugation of the tube is completed by hydrostatic pressure in a manner well understood in the art, an intermediate stage in the formation of the corrugations being illustrated in Fig. 5. The corrugating operation being completed, the fins 21 assume the relationship to the completed corrugations 55 which is shown on an enlarged scale in the fragmentary section of Fig. 2 wherein each fin is in face contact with one of the parallel walls of a corrugation.

It will therefore be perceived that the method of providing the bellows with damping fins as described involves no mechanical attachment or connection of the fins to the metal of the bellows to in any way interfere with the normal characteristics of the metal in the bellows folds as respects its capacity to bend and to respond to elastic forces. At the same time the fins are actually integrated into the bellows structure and cannot become cocked or displaced with respect thereto because they are firmly held against displacement by reason of the curved inner flanges of the fins snugly fitting the curved inner bends of the corrugations.

It will therefore be perceived that by the present invention a novel method of making a damping bellows has been provided whereby without altering the resilient and bending characteristics of the bellows metal the damping elements have been securely integrated into the bellows structure against undesired displacement. The method of producing the bellows is one that can be readily carried out in apparatus for hydrostatically producing bellows now in use and without altering the method of producing bellows hydrostatically, and the resulting bellows with its damping elements can be produced expeditiously and inexpensively to provide a damped bellows which is certain and regular in operation.

While the method of the invention has been described with particularity, it is to be expressly understood that the invention is not limited thereto as changes in details of procedure and in the details of construction will now be readily apparent to those skilled in the art without departing from the spirit of the present invention. Thus the fins may have configurations other than circular and other shapes, constructions and forms of damping elements may be used, all as will now be apparent to those skilled in the art, without departing from the spirit of the present invention. Reference is therefore to be had to the appended claims for a definition of said invention.

What is claimed is:

1. The method of making a damping bellows which includes the steps of forming annular fins having inner extremities curved to conform with the inner bends of the bellows wall to which said fins are to be attached, mounting said fins on the periphery of a tube to be corrugated, and locking said fins to the tube by forming corrugations in said tube between said fins with the inner bends of said corrugations fitting the curved inner extremities of said fins.

2. The method of making a damping bellows which includes the steps of forming annular fins, mounting said fins on the periphery of a tube to be corrugated, bulging the tube between said fins to lock the fins to the tube, and converting the bulges into parallel walled corrugations having face contact with said fins.

3. The method of making a damping bellows which includes the steps of forming annular fins having curved inner extremities conforming to the curvature of the inner bends of the corrugations to be formed, mounting said fins on the periphery of a tube to be corrugated, bulging the tube by hydrostatic pressure between the fins to lock said fins in position, and subjecting the tube to hydrostatic pressure to form said bulges into corrugations contacting said fins both at the curved inner extremity and at the face of the fin.

4. The method of making a damping bellows which includes the steps of forming annular fins having inner peripheries curved to fit the inner edges of the forming rings of a hydrostatic corrugating machine, mounting said fins on said forming rings, and hydrostatically forming corrugations in a tube mounted in said rings to bulge said tube between said fins and lock said fins between said corrugations.

5. The method of making a damping bellows which includes the steps of forming annular fins having inner peripheries to fit the inner edges of the forming rings of a hydrostatic corrugating machine, mounting said fins on said forming rings, spacing said forming rings uniformly by interposed spacers, locking said fins to a tube to be corrugated by bulging the tube between said rings, withdrawing said spacers, and completing the corrugations around said fins.

6. The method of making a damping bellows which includes the steps of forming annular fins having inner peripheries curved to fit the inner edges of the forming rings of a hydrostatic corrugating machine, mounting said fins on said forming rings, locking said fins to a tube to be corrugated by bulging the tube between said rings while said fins are mounted thereon, and converting said bulges into corrugations.

7. The method of making a damping bellows which includes the steps of forming fins each having a central aperture surrounded by an annular flange which is axially curved to conform with the inner bends of the corrugations to be formed, mounting said fins on the tube to be corrugated, and forming corrugations in said tube with their inner bends curved into face contact with the surfaces of said flanges to lock the fins against relative movement while leaving the corrugation bends free to flex upon expansion of the bellows.

8. The method of making a damping bellows which includes the steps of forming fins each having a central aperture surrounded by an annular flange which is axially curved to conform with the inner bends of the corrugations to be formed, mounting said fins on die rings with their annular flanges embracing the inner periphery thereof, and forming corrugations in said tube with their inner bends curved into face contact with the surfaces of said flanges to lock the fins against relative movement while leaving the corrugation bends free to flex upon expansion of the bellows.

9. The method of making a damping bellows which includes the steps of forming fins each having a central aperture surrounded by an annular flange which is axially curved to conform with the inner bends of the corrugations to be formed, mounting said fins on the tube to be corrugated, and forming corrugations in said tube with their inner bends curved into face contact with the surfaces of said flanges by bulging the tube between the fins to lock the fins against relative movement while leaving the corrugation bends free to flex upon expansion of the bellows.

10. The method of making a damping bellows which includes the steps of forming fins each having a central aperture surrounded by an annular flange which is axially curved to conform with the inner bends of the corrugations to be formed, mounting said fins on die rings with their annular flanges embracing the inner periphery thereof, and forming corrugations in said tube with their inner bends curved into face contact with the surfaces of said flanges by bulging the tube between the fins to lock the fins against relative movement while leaving the corrugation bends free to flex upon expansion of the bellows.

11. The method of making a damping bellows which includes the steps of forming fins each having a central aperture surrounded by an anular flange which is axially curved to conform with the inner bends of the corrugations to be formed, mounting said fins on the tube to be corrugated, and forming corrugations in said tube with their inner bends curved into face contact with the surfaces of said flanges by bulging the tube by hydrostatic pressure between the fins to lock the fins against relative movement while leaving the corrugation bends free to flex upon expansion of the bellows.

12. The method of making a damping bellows which includes the steps of forming fins each having a central aperture surrounded by an annular flange which is axially curved to conform with the inner bends of the corrugations to be formed, mounting said fins on die rings with their annular flanges embracing the inner periphery thereof, and forming corrugations in said tube with their inner bends curved into face contact with the surfaces of said flanges by bulging the tube by hydrostatic pressure between the fins to lock the fins against relative movement while leaving the corrugation bends free to flex upon expansion of the bellows.

JEAN V. GIESLER.

REFERENCES CITED

The following references are of record in the file of this patent:

UNITED STATES PATENTS

| Number | Name | Date |
| --- | --- | --- |
| 1,320,430 | Wheeler | Nov. 4, 1919 |
| 1,698,210 | Bezzenberger | Jan. 8, 1929 |
| 1,744,074 | Gortner | Jan. 21, 1930 |
| 1,788,474 | Trane | Jan. 13, 1931 |
| 1,823,532 | Clifford | Sept. 15, 1931 |
| 1,998,552 | Mautsch | Apr. 23, 1935 |
| 2,072,847 | Bolesky | Mar. 9, 1937 |
| 2,083,943 | Clifford | June 15, 1937 |
| 2,129,120 | Davis | Sept. 6, 1938 |
| 2,216,778 | Houdry | Oct. 8, 1940 |
| 2,305,064 | Colwell et al. | Dec. 15, 1942 |
| 2,368,403 | Barnes | Jan. 30, 1945 |